United States Patent
Nefcy et al.

(10) Patent No.: US 9,475,495 B2
(45) Date of Patent: Oct. 25, 2016

(54) TORQUE CONVERTER CLUTCH CAPACITY BASED ON REGENERATIVE BRAKING REQUEST

(71) Applicant: FORD GLOBAL TECHNOLOGIES, LLC, Dearborn, MI (US)

(72) Inventors: Bernard D. Nefcy, Novi, MI (US); Francis Thomas Connolly, Ann Arbor, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 14/591,232

(22) Filed: Jan. 7, 2015

(65) Prior Publication Data

US 2016/0194008 A1    Jul. 7, 2016

(51) Int. Cl.
*B60W 30/18* (2012.01)
*B60K 6/387* (2007.10)
(Continued)

(52) U.S. Cl.
CPC ........ *B60W 30/18127* (2013.01); *B60K 6/387* (2013.01); *B60K 6/46* (2013.01); *B60L 1/003* (2013.01); *B60L 7/14* (2013.01); *B60L 7/26* (2013.01); *B60L 11/14* (2013.01); *B60L 15/2009* (2013.01); *B60W 10/023* (2013.01); *B60W 10/08* (2013.01); *B60W 20/10* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/425* (2013.01); *B60L 2240/445* (2013.01); *B60L 2240/461* (2013.01); *B60L 2240/486* (2013.01); *B60L 2240/507* (2013.01); *B60L 2250/26* (2013.01); *B60L 2270/145* (2013.01); *B60W 2540/12* (2013.01); *B60W 2710/027* (2013.01); *B60W 2710/083* (2013.01);
(Continued)

(58) Field of Classification Search
CPC .................... B60W 30/18127; B60W 10/023; B60W 10/08; B60W 10/06; B60W 10/02; B60W 20/00; B60W 2710/083; B60W 30/18136; B60W 2510/0275; B60W 2710/08; B60W 2540/10; B60W 2510/0233; B60W 2710/024; Y10T 477/26; Y10T 477/24; Y10T 477/23; Y10T 477/865; Y10T 477/33; Y10T 477/32; Y10T 477/635; Y10T 477/6318; Y10T 477/6425; Y10T 477/641; B60K 6/26; F02D 2400/012; B60Y 2200/92
USPC ................ 701/22, 51, 54, 67; 903/946, 947; 192/219, 220; 475/5
See application file for complete search history.

(56) References Cited

U.S. PATENT DOCUMENTS 7,637,842 B2   12/2009   Tamai et al.
8,430,790 B2   4/2013    Kobayashi et al.
(Continued)

Primary Examiner — Marthe Marc-Coleman
(74) Attorney, Agent, or Firm — David B. Kelley; Brooks Kushman P.C.

(57) ABSTRACT

A vehicle includes an engine, a transmission, and an electric machine configured to provide drive torque and regenerative braking torque. The electric machine is selectively coupled to the engine via a clutch. The vehicle additionally includes a torque converter with an associated bypass clutch coupling the electric machine and transmission. The bypass clutch has an associated torque capacity. The vehicle further includes a controller. The controller is configured to, in response to a braking request indicative of an anticipated regenerative braking request, increase the torque capacity prior to the regenerative braking event by a quantity corresponding to an anticipated regenerative braking torque associated with the anticipated regenerative braking event.

15 Claims, 2 Drawing Sheets

(51) Int. Cl.
*B60K 6/46* (2007.10)
*B60L 7/18* (2006.01)
*B60W 10/02* (2006.01)
*B60W 10/08* (2006.01)
*B60W 20/00* (2016.01)
*B60L 1/00* (2006.01)
*B60L 7/14* (2006.01)
*B60L 7/26* (2006.01)
*B60L 11/14* (2006.01)
*B60L 15/20* (2006.01)

(52) U.S. Cl.
CPC ........... *Y10S903/914* (2013.01); *Y10S 903/93* (2013.01); *Y10S 903/946* (2013.01); *Y10S 903/947* (2013.01)

(56) References Cited

U.S. PATENT DOCUMENTS

| | | | |
|---|---|---|---|
| 8,538,644 B2 | 9/2013 | Whitney et al. | |
| 8,721,496 B2 | 5/2014 | Nefcy et al. | |
| 2007/0261901 A1* | 11/2007 | Janson | B60K 6/365 180/65.31 |
| 2009/0118886 A1* | 5/2009 | Tamai | B60W 20/11 701/22 |
| 2009/0118887 A1* | 5/2009 | Minarcin | B60K 6/365 701/22 |
| 2013/0244829 A1* | 9/2013 | Nefcy | B60W 10/08 477/15 |
| 2014/0046529 A1 | 2/2014 | Gibson et al. | |

* cited by examiner

TORQUE CONVERTER CLUTCH CAPACITY BASED ON REGENERATIVE BRAKING REQUEST

TECHNICAL FIELD

This disclosure relates to control systems and methods for a vehicle including a hybrid powertrain with a torque converter having an associated bypass clutch arranged between a traction motor and a transmission.

BACKGROUND

Conventional automatic vehicles may include a transmission having a torque converter to provide a hydrodynamic coupling with torque multiplication. The hydrodynamic coupling allows the engine to continue running while connected to the transmission when the vehicle is stationary. In addition, the torque converter provides torque multiplication to assist vehicle launch and provides damping of driveline torque disturbances. The torque multiplication or torque ratio varies with the speed difference or slip between the torque converter input element (impeller) and output element (turbine). A torque converter clutch or bypass clutch may be provided to mechanically or frictionally couple the impeller and the turbine to eliminate the slip and associated losses to improve efficiency. The bypass clutch has an associated clutch capacity indicating a maximum torque transferrable by the torque converter without slipping.

Similarly, hybrid vehicle powertrains may include a transmission or gearbox having a torque converter arranged downstream of an electric machine, i.e. between the electric machine and vehicle wheels. The electric machine may be configured to provide either drive torque, which may conventionally be referred to as positive torque, or regenerative braking torque, which may be referred to as negative torque.

SUMMARY

A vehicle according to the present disclosure includes an engine, a transmission, and an electric machine configured to provide drive torque and regenerative braking torque. The electric machine is selectively coupled to the engine via a clutch. The vehicle additionally includes a torque converter with an associated bypass clutch coupling the electric machine and transmission. The bypass clutch has an associated torque capacity. The vehicle further includes a controller. The controller is configured to, in response to a braking request indicative of an anticipated regenerative braking request, increase the torque capacity prior to the regenerative braking event by a quantity corresponding to an anticipated regenerative braking torque associated with the anticipated regenerative braking event.

In various embodiments, the braking request may be initiated by a driver actuation of a brake pedal or a driver release of an accelerator pedal. In some embodiments, the controller is configured to increase the torque capacity at a rate based on a capacitization response rate of the bypass clutch.

A method of controlling a vehicle according to the present disclosure, wherein the vehicle has an engine, a traction motor, a clutch configured to selectively couple the engine and traction motor, and a torque converter coupling the motor to a gearbox, includes increasing a torque capacity of a bypass clutch associated with the torque converter. The torque capacity is increased in response to an anticipated application of regenerative braking torque associated with a braking request. The torque capacity is increased by a quantity corresponding to the anticipated regenerative braking torque. The method additionally includes, in response to the braking request, controlling the traction motor to provide regenerative braking torque after the torque capacity is increased.

A vehicle according to the present disclosure includes traction wheels, an electric machine configured to provide regenerative braking torque to the traction wheels, a clutch configured to selectively operatively couple the electric machine and traction wheels, and at least one controller. The controller is configured to, in response to an anticipated increase in magnitude of an input torque to the clutch based on a braking request, increase a torque capacity associated with the clutch prior to the increase in magnitude.

Embodiments according to the present disclosure provide a number of advantages. For example, embodiments disclosed herein provide a system and method for controlling a clutch downstream of an electric machine to ensure adequate clutch capacity prior to initiating a regenerative braking event. Furthermore, embodiments according to the present disclosure may reduce the use of vehicle friction brakes, extending the use life of various braking components.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
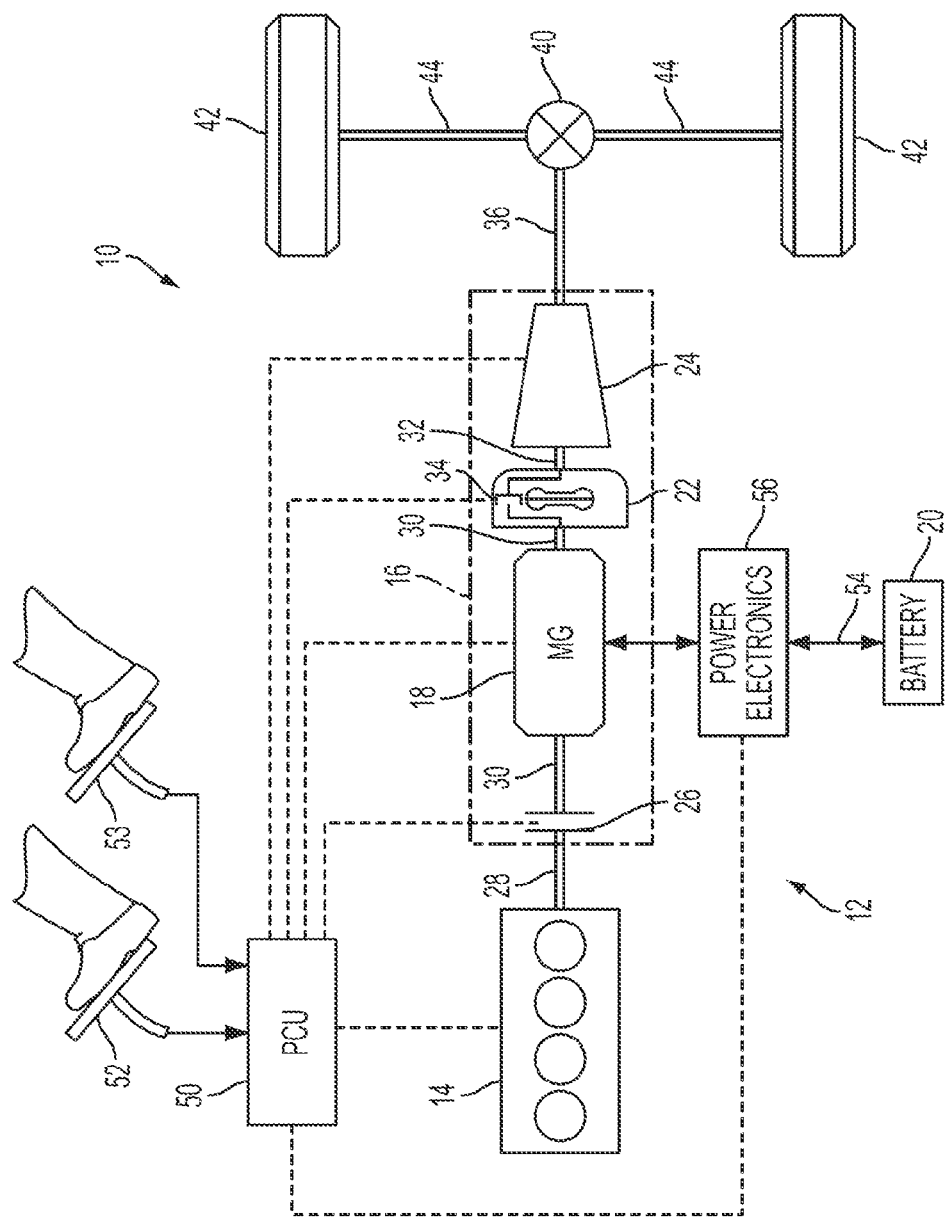
FIG. 1 illustrates an embodiment of a vehicle according to the present disclosure in schematic form.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. In some applications, disconnect clutch 26 is generally referred to as an upstream clutch and torque converter bypass clutch 34 (which may be a launch clutch) is generally referred to as a downstream clutch. The torque converter bypass clutch 34 has an associated clutch capacity. The clutch capacity may be adjusted by increasing or decreasing a clamp load in the torque converter bypass clutch 34, e.g. by increasing or decreasing a hydraulic pressure in the torque converter bypass clutch 34, in response to a signal from an associated controller, such as a powertrain control unit (PCU) 50.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example.

A brake pedal 53 is used by the driver of the vehicle to provide a demand for braking or negative torque to slow the vehicle. In general, depressing and releasing the brake pedal 53 generates a brake pedal position signal that may be interpreted by the controller 50 as a demand for increased braking or decreased braking, respectively. Based at least upon input from the pedal, the controller 50 commands braking torque from vehicle brakes (not illustrated). The vehicle brakes generally include friction brakes. The M/G 18 may additionally act as a generator to provide regenerative braking, in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, and/or an additional motor may be provided to start the engine 14. Other configurations are contemplated without deviating from the scope of the present disclosure.

Known methods for controlling the torque converter 22 involve adjusting the clutch capacity of the torque converter bypass clutch 34 in response to a change in input torque to the impeller of the torque converter 22. The input torque may be a sum of an engine torque, an electric machine torque, and/or other driveline torques. In response to an increase in input torque the clutch capacity is increased, and in response to a decrease in input torque the clutch capacity is decreased. In conventional (i.e. non-hybrid) powertrains this control is advantageous, as large changes in input torque result in clutch slip while the clutch capacity is adjusted, serving to filter transient changes in the driveline.

However, in a hybrid powertrain having a torque converter arranged downstream of an electric machine, as in the embodiment illustrated in FIG. 1, it may be undesirable in some circumstances to modify the clutch capacity only after the input torque has changed. During a regenerative braking event, the M/G 18 applies negative torque to the input of the transmission. During such an event, slippage in the torque converter bypass clutch 34 may result in a decrease of the input speed to the torque converter 22. In response to such a speed decrease, the speed of the transmission pump also decreases, which may result in additional clutch opening or slipping in the transmission. In addition, if the torque converter bypass clutch does not have adequate clutch capacity, friction brakes may be applied to provide braking torque to satisfy the braking request while the torque converter bypass clutch is capacitized.

Figure 2:
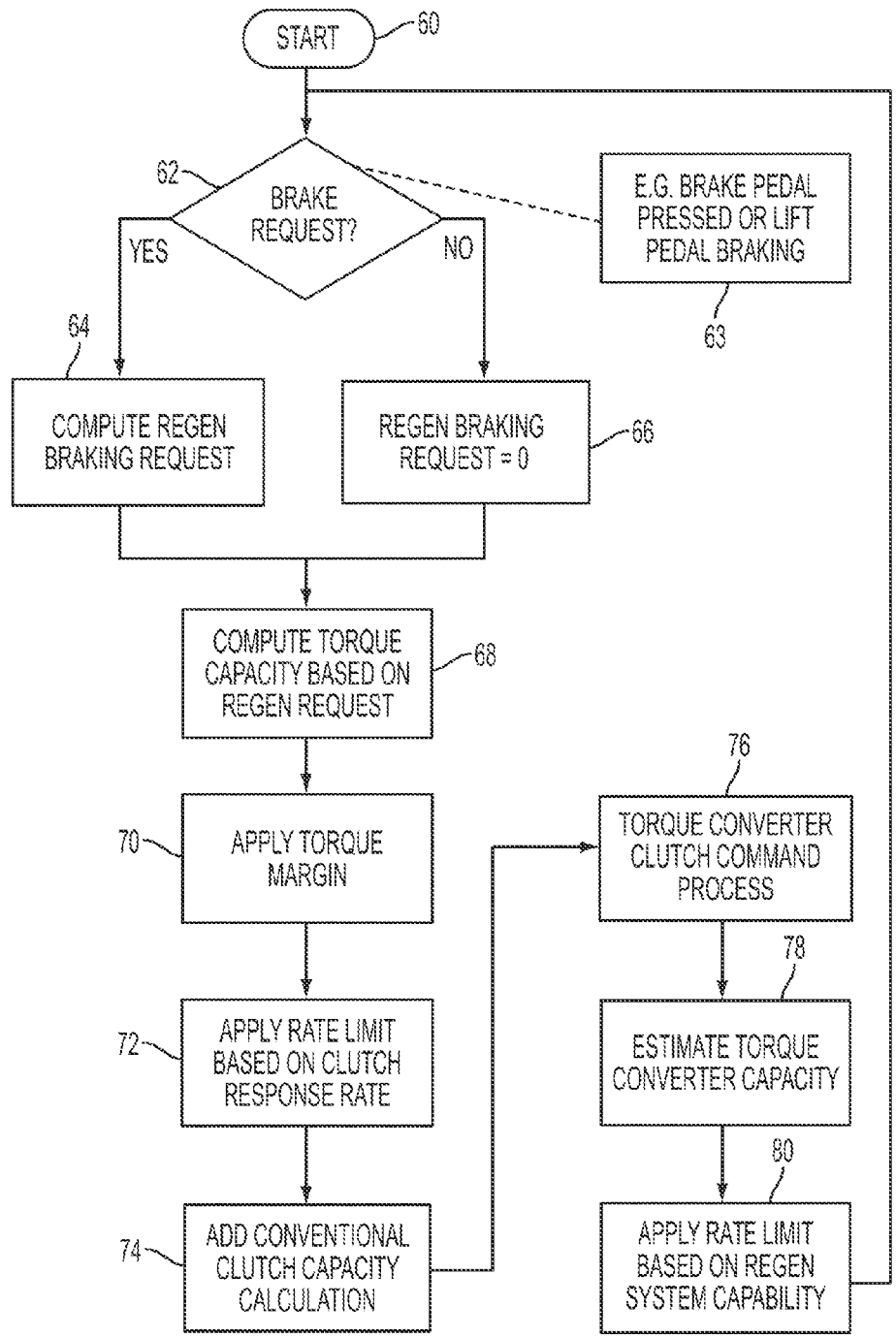
FIG. 2 illustrates a method of controlling a vehicle according to the present disclosure in flowchart form.

Referring to FIG. 2, a method of controlling a vehicle according to the present disclosure is illustrated in flowchart form. The algorithm begins at block 60. A determination is made of whether a brake request is present, as illustrated at operation 62. The brake request may be, for example, in response to a driver actuation of a brake pedal or a driver release of an accelerator pedal ("lift pedal braking"), as illustrated at block 63. If yes, then a regenerative braking request is calculated as a braking torque as illustrated at block 64. If no, the regenerative braking request is set to 0, as illustrated at block 66.

In either case, a torque converter bypass torque capacity requirement is calculated, as illustrated at block 68. A torque capacity margin is subsequently added to the calculated requirement, as illustrated at block 70. As a nonlimiting example, a margin of approximately 20% of the calculated torque requirement may be provided. A first rate limit is subsequently applied, as illustrated at block 72, to result in a rate limited torque requirement based on the regenerative braking request. This rate limit is based on a capacitization response rate of the torque converter bypass clutch. The first rate limit is implemented to ensure that the commanded clutch capacity does not change more rapidly than the torque converter bypass clutch is physically able to capacitize. The resulting rate limited torque requirement based on the regenerative braking request is subsequently added to the conventional clutch capacity calculation to obtain a combined torque requirement, as illustrated at block 74.

The torque converter bypass clutch is then commanded to capacitize to the combined torque requirement, as illustrated at block 76. Because the torque capacity calculations illustrated in blocks 68-74 are performed in response to the regenerative braking request itself, the capacitization may be initiated prior to the actual application of the regenerative braking torque. Thus, when the electric machine is commanded to provide regenerative braking torque, the torque converter bypass clutch capacity may already be increased accordingly.

The actual torque converter capacity is then estimated, as illustrated at block 78. A second rate limit is then applied, as illustrated at block 80. The second rate limit is based on capabilities of the powertrain and regenerative braking system. The algorithm subsequently returns to operation 62.

Variations on the above system and method are, of course, possible. As an example, the method may be used in conjunction with not only a torque converter bypass clutch, but also other devices that can slip between an electric machine and traction wheels.

As may be seen, the above system and method provide various advantages. The torque converter bypass clutch capacity is increased to provide adequate capacity for a regenerative braking event prior to the initiation of the braking event. Thus, potentially detrimental reductions in input speed to the torque converter may be avoided. Furthermore, because the torque converter bypass clutch has adequate capacity prior to activation of the regenerative brakes, it may not be necessary to engage friction brakes at the beginning of the braking event as in prior art systems, thus reducing wear on the friction brakes.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine;
   a transmission;
   an electric machine configured to provide drive torque and regenerative braking torque, the electric machine being selectively coupled to the engine via a clutch;
   a torque converter and associated bypass clutch coupling the electric machine and transmission, the bypass clutch having an associated torque capacity; and
   a controller configured to, in response to a braking request indicative of an anticipated regenerative braking event, increase the torque capacity prior to the regenerative braking event by a quantity corresponding to an anticipated regenerative braking torque associated with the anticipated regenerative braking event.

2. The vehicle of claim 1, wherein the braking request is initiated by a driver actuation of a brake pedal.

3. The vehicle of claim 1, wherein the braking request is initiated by a driver release of an accelerator pedal.

4. The vehicle of claim 1, wherein the controller is configured to increase the torque capacity at a rate based on a capacitization response rate of the bypass clutch.

5. The vehicle of claim 1, wherein the controller is further programmed to increase hydraulic pressure in the bypass clutch to increase the torque capacity of the bypass clutch.

6. A method of controlling a vehicle having an engine, a traction motor, a clutch configured to selectively couple the engine and traction motor, and a torque converter with associated bypass clutch coupling the motor to a gearbox, the method comprising:
   in response to an anticipated application of regenerative braking torque associated with a braking request, increasing a torque capacity of the bypass clutch by a quantity corresponding to the anticipated regenerative braking torque; and
   in response to the braking request, controlling the traction motor to provide regenerative braking torque after the torque capacity is increased.

7. The method of claim 6, wherein the braking request is initiated by a driver actuation of a brake pedal.

8. The method of claim 6, wherein the braking request is initiated by a driver release of an accelerator pedal.

9. The method of claim 6, wherein the torque capacity is increased at a rate based on a capacitization response rate of the bypass clutch.

10. The method of claim 6, wherein the increasing of torque capacity of the bypass clutch includes increasing hydraulic pressure in the torque converter bypass clutch.

11. A vehicle comprising:
    traction wheels;
    an electric machine configured to provide regenerative braking torque to the traction wheels;
    a clutch configured to selectively operatively couple the electric machine and traction wheels; and
    at least one controller configured to, in response to an anticipated increase in magnitude of an input torque to the clutch based on a braking request, increase a torque capacity associated with the clutch prior to the increase in magnitude.

12. The vehicle of claim 11, wherein the braking request is initiated by a driver actuation of a brake pedal.

13. The vehicle of claim 11, wherein the braking request is initiated by a lift pedal braking request.

14. The vehicle of claim 11, wherein the controller is configured to increase the torque capacity at a rate based on a capacitization response rate of the clutch.

15. The vehicle of claim 11, wherein the at least one controller is further programmed to increase hydraulic pressure in the clutch to increase the torque capacity of the clutch.

* * * * *